United States Patent
Matsuda et al.

(10) Patent No.: US 7,392,272 B2
(45) Date of Patent: Jun. 24, 2008

(54) CALCULATION DEVICE AND CALCULATION METHOD

(75) Inventors: Hiromi Matsuda, Kanagawa (JP); Miki Abe, Kanagawa (JP); Eiichiro Morinaga, Tokyo (JP); Masao Tanaka, Kanagawa (JP)

(73) Assignee: Sony Corporation, Tokyo (JP)

(*) Notice: Subject to any disclaimer, the term of this patent is extended or adjusted under 35 U.S.C. 154(b) by 717 days.

(21) Appl. No.: 10/480,803

(22) PCT Filed: Apr. 18, 2003

(86) PCT No.: PCT/JP03/04999

§ 371 (c)(1),
(2), (4) Date: Dec. 19, 2003

(87) PCT Pub. No.: WO03/090186

PCT Pub. Date: Oct. 30, 2003

(65) Prior Publication Data

US 2004/0162869 A1    Aug. 19, 2004

(30) Foreign Application Priority Data

Apr. 19, 2002    (JP) .............................. 2002-118507

(51) Int. Cl.
*G06F 7/38* (2006.01)
(52) U.S. Cl. ...................................... 708/490
(58) Field of Classification Search ................. 708/490
See application file for complete search history.

(56) References Cited

U.S. PATENT DOCUMENTS

| | | | |
|---|---|---|---|
| 4,937,574 A | 6/1990 | Wright | |
| 5,784,462 A * | 7/1998 | Tomida et al. | 380/270 |
| 2004/0090391 A1* | 5/2004 | Kondo | 345/1.1 |
| 2006/0265228 A1* | 11/2006 | Ando | 705/1 |

FOREIGN PATENT DOCUMENTS

| | | |
|---|---|---|
| JP | 61-251255 | 11/1986 |
| JP | 64-500227 | 1/1989 |
| JP | 11-109853 | 4/1999 |
| JP | 11-505055 | 5/1999 |
| JP | 11-266240 | 9/1999 |
| JP | 11-513864 | 11/1999 |
| JP | 2001-016655 | 1/2001 |

* cited by examiner

*Primary Examiner*—Tan V. Mai
(74) *Attorney, Agent, or Firm*—Oblon, Spivak, McClelland, Maier & Neustadt, P.C.

(57) ABSTRACT

An arithmetic unit and an arithmetic method that output no information necessary for decryption or encryption to the outside and can perform a self-protecting function when an illegal attack is made. A command monitoring part (44) monitors input command sequences. In a first sequence, a process key in a first stage is calculated from a hardware key (Khd) and is then written to a key storing part (47). In each of the following sequences, a process key in a next stage is calculated from a process key stored in the key storing part (47). When commands of predetermined contents are inputted in predetermined order, a content key is calculated and then written to the key storing part (47). Encrypted data is decrypted with the content key, and the result is outputted from data output means (63). When an illegal attack is made, initialization is performed by selecting fixed value data (Kf) as key data (Ksl) and selecting fixed value data (Df) as input data (Ein).

14 Claims, 4 Drawing Sheets

FIG. 2

| SEQUENCE | COMMAND | SELECTED KEY DATA Ksl | INPUT DATA Ein | OUTPUT DATA Eout |
|---|---|---|---|---|
| 1 | A1 | Khd (HARDWARE KEY) | Din | K1 |
| 2 | A2 | K1 | Din | K2 |
| 3 | A3 | K2 | Din | K3 |
| ..... | ..... | ..... | ..... | ..... |
| n−1 | An−1 | Kn−2 | Din | |
| n | An | Kn−1 | Din | Krt (ROOT KEY) |
| n+1 | B1 | Krt (ROOT KEY) | Drt | Edt″(1)″ |
| n+2 | C1 | Krt (ROOT KEY) | Din | DATA AFTER OPERATION |
| n+3 | C2 | Krt (ROOT KEY) | Din | DATA AFTER OPERATION |
| n+4 | C3 | Krt (ROOT KEY) | Din | DATA AFTER OPERATION |
| n+5 | C4 | Krt (ROOT KEY) | Din | Kct (CONTENT KEY) |
| ATTACK 1 | C1 | Krt (ROOT KEY) | Din | DATA AFTER OPERATION |
| ATTACK 2 | C3 | Krt (ROOT KEY) | Din | PROCESSING AGAINST ATTACK |

Drt: VERIFYING DATA

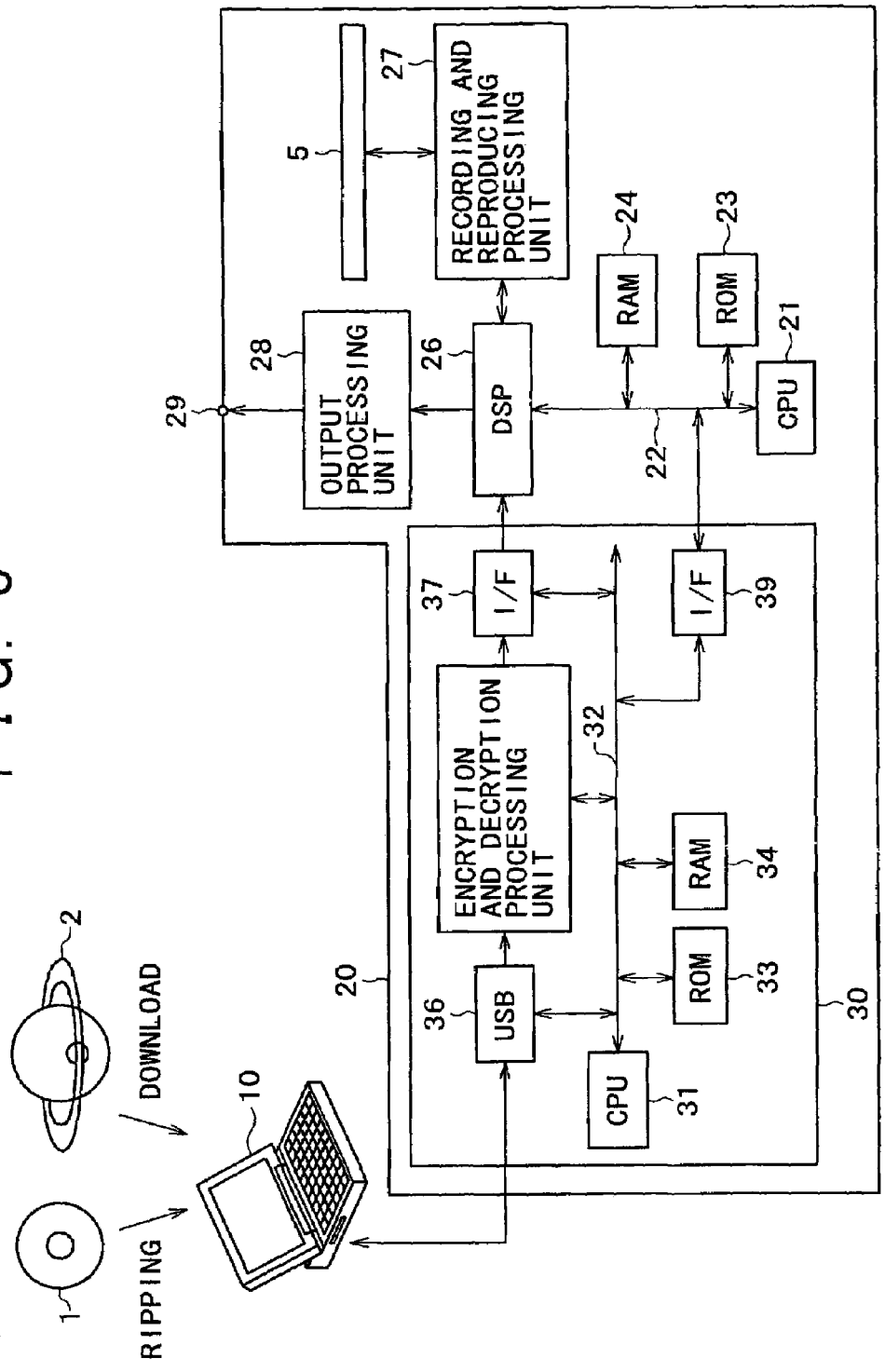

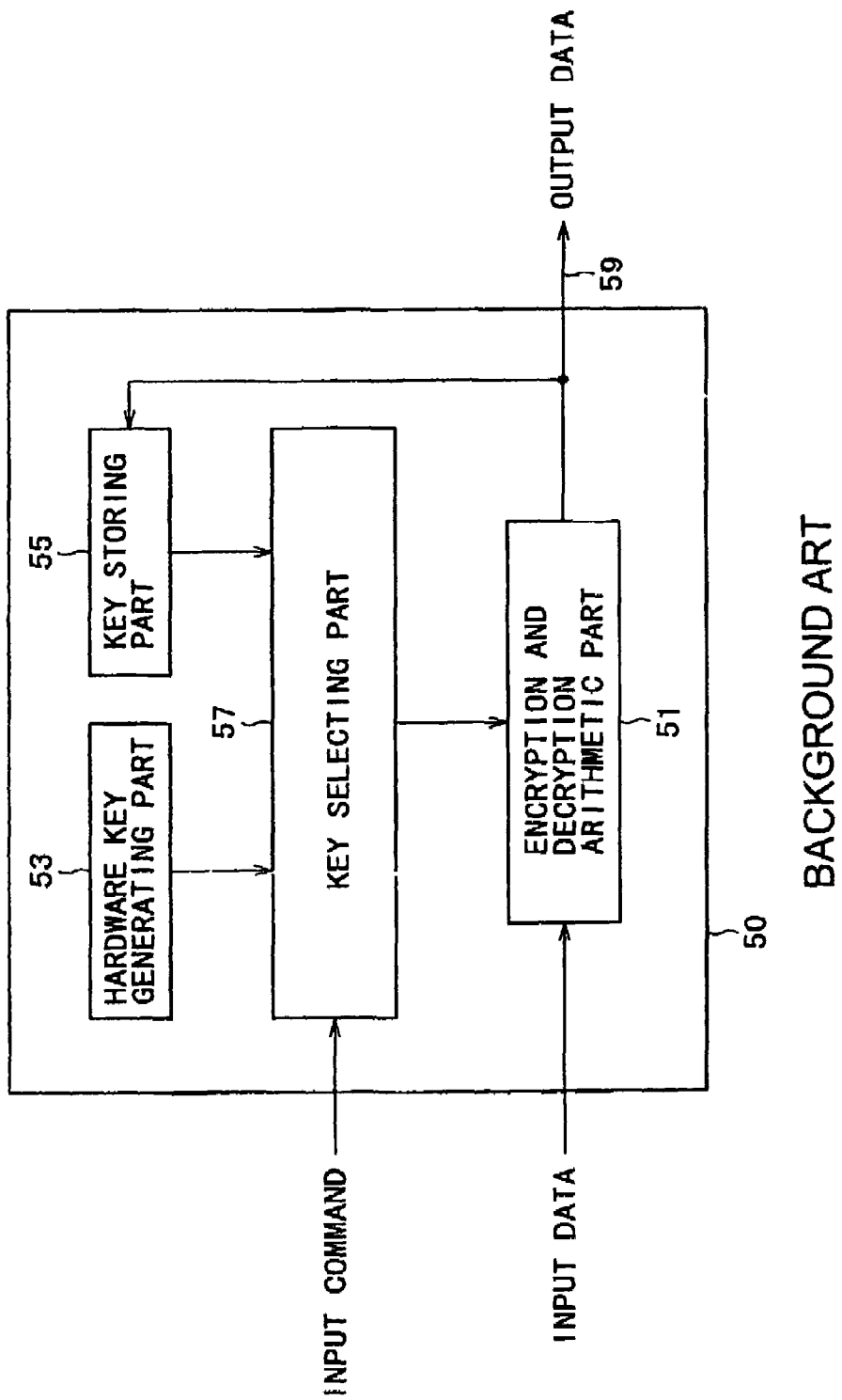

CALCULATION DEVICE AND CALCULATION METHOD

TECHNICAL FIELD

The present invention relates to a unit and a method for calculating data.

BACKGROUND ART

A device as shown in FIG. 4 as an encrypting and decrypting device is considered. An encryption and decryption processing unit 50 is shown as a part exclusive of interfaces, a CPU, and the like of the encrypting and decrypting device integrated into an IC (Integrated Circuit). The encryption and decryption processing unit 50 includes an encryption and decryption arithmetic part 51, a hardware key generating part 53, a key storing part 55, and a key selecting part 57. The key selecting part 57 is externally supplied with an input command. The encryption and decryption arithmetic part 51 is externally supplied with input data. The encryption and decryption arithmetic part 51 outputs output data to the outside.

The hardware key generating part 53 within the encryption and decryption processing unit 50 subjects secret key data serving as a fundamental basis written in a ROM to an operation, for example. The hardware key generating part 53 thereby generates a hardware key as primitive secret key data and then inputs the generated hardware key to the key selecting part 57.

By inputting an input command, the key selecting part 57 first selects the hardware key from the hardware key generating part 53. The encryption and decryption arithmetic part 51 subjects the hardware key to an operation with input data to calculate a process key in a first stage. The process key in the first stage is written through an output line 59 to the key storing part 55.

Next, the process key in the first stage read from the key storing part 55 is selected by the key selecting part 57 and subjected to an operation with input data by the encryption and decryption arithmetic part 51. Thereby a process key in a second stage is calculated and then written to the key storing part 55 in place of the process key in the first stage.

The encryption and decryption arithmetic part 51 similarly calculates subsequent process keys in a third stage and following stages. The encryption and decryption arithmetic part 51 finally calculates a content key as secret key data for decrypting or encrypting data. The content key is written to the key storing part 55.

In this state, when a command for specifying a decryption mode is inputted as an input command, and encrypted data is inputted as input data, the content key read from the key storing part 55 is selected by the key selecting part 57 and subjected to an operation with the encrypted data by the encryption and decryption arithmetic part 51, whereby the encrypted data is decrypted. The plaintext data is outputted to the output line 59.

Similarly, when a command for specifying an encryption mode is inputted as an input command, and plaintext data is inputted as input data, the plaintext data is encrypted, and the encrypted data is outputted to the output line 59.

However, the above-described encrypting and decrypting device outputs the process keys and the content key to the output line 59, that is, to the outside of the encrypting and decrypting device from the encryption and decryption arithmetic part 51 in the process of decryption or encryption. These keys can be seen from the outside of the encrypting and decrypting device. Thus, secrecy of the secret key data, especially the hardware key whose secrecy is to be ensured is not ensured. In addition, it is possible that a person illegally attacking the device can have the content key calculated by inputting a combination of various commands and illegally decrypt data. Thus a sufficient level of security is not provided.

It is accordingly an object of the present invention to realize an arithmetic unit and an arithmetic method that ensure security of data as a result of arithmetic processing.

DISCLOSURE OF INVENTION

According to the present invention, there is provided an arithmetic unit including data input means for inputting data to be subjected to arithmetic processing, command input means for inputting a command for specifying processing on the data, arithmetic processing means for subjecting the data inputted by the data input means to arithmetic processing, data output means for outputting the data processed by the arithmetic processing means, output selecting means for selecting data to be outputted from the data output means, and control means for controlling the output selecting means. Only data allowed to be outputted is outputted from the data output means on the basis of the command inputted by the command input means.

According to the present invention, there is provided an arithmetic method including the steps of performing arithmetic processing on input data on the basis of an input command, determining whether the input command specifies output of a result of the arithmetic processing, and outputting the result of the arithmetic processing on the input data when the command specifies the output of the result of the arithmetic processing.

With the arithmetic unit and the arithmetic method according to the present invention as described above, security of data as a result of arithmetic processing is ensured.

BRIEF DESCRIPTION OF DRAWINGS

FIG. 2 is a diagram of assistance in explaining operation of the arithmetic unit of FIG. 1;

FIG. 3 is a diagram showing an example of a data receiving apparatus including the arithmetic unit according to the present invention; and FIG. 4 is a diagram showing an example of an arithmetic unit considered.

BEST MODE FOR CARRYING OUT THE INVENTION

Figure 1:
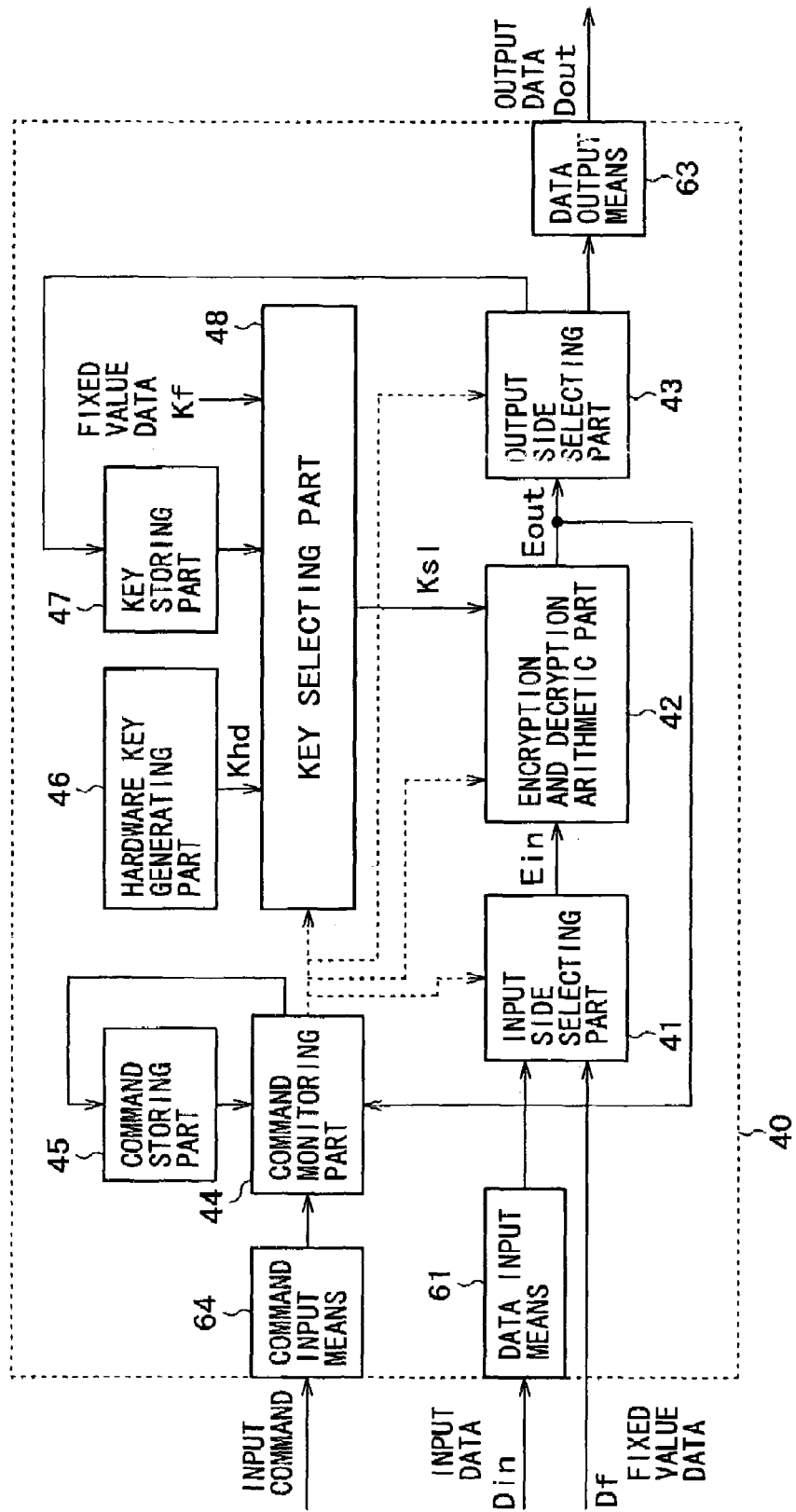
FIG. 1 is a diagram showing an embodiment of an arithmetic unit according to the present invention.

FIG. 1 shows an embodiment of an arithmetic unit according to the present invention. The unit is an encrypting and decrypting unit.

An encryption and decryption processing unit 40 is shown as a part exclusive of interfaces, a CPU, and the like of an encrypting and decrypting unit integrated into an IC as described later. The encryption and decryption processing unit 40 includes data input means 61, an input side selecting part 41, an encryption and decryption arithmetic part 42, an output side selecting part 43, data output means 63, command input means 64, a command monitoring part 44 including a command storing part 45, a hardware key generating part 46, a key storing part 47, and a key selecting part 48.

Input data Din is inputted into the encryption and decryption processing unit 40 by the data input means 61. As later described, the input side selecting part 41 selects either the input data Din or fixed value data Df under control of the command monitoring part 44 and then inputs the selected data as input data Ein to the encryption and decryption arithmetic part 42.

Under control of the command monitoring part 44, the encryption and decryption arithmetic part 42 subjects key data Ksl selected by the key selecting part 48 as later described and the input data Ein from the input side selecting part 41 to an arithmetic operation, thereby calculates process keys and root keys to be described later and finally calculates a content key. Also, the encryption and decryption arithmetic part 42 decrypts or encrypts data with the content key by an encryption algorithm such as DES (Data Encryption Standard), Triple DES, or the like.

Under control of the command monitoring part 44, when key data (a process key, a root key, or a content key) is obtained as output data Eout of the encryption and decryption arithmetic part 42, the output side selecting part 43 stores the key data in the key storing part 47 for selection of key data by the key selecting part 48. When decrypted or encrypted data is obtained as output data Eout of the encryption and decryption arithmetic part 42, the output side selecting part 43 outputs the data as output data Dout to the outside of the encryption and decryption processing unit 40 by the data output means 63.

A command is inputted into the encryption and decryption processing unit 40 by the command input means 64. When input commands are inputted in a series of sequences, the command monitoring part 44 circularly stores the commands one by one in the command storing part 45 and circularly reads the commands from the command storing part 45. The command monitoring part 44 thus monitors the input command sequences and controls the input side selecting part 41, the encryption and decryption arithmetic part 42, the output side selecting part 43, and the key selecting part 48 according to a result of the monitoring as later described.

The hardware key generating part 46 for example subjects secret key data serving as a fundamental basis written in a ROM to an operation by transposition in bit units, inversion, calculation of an exclusive disjunction (EOR; XOR), and the like, and thereby generates a hardware key Khd. The generated hardware key Khd is inputted to the key selecting part 48.

Key data (a process key, a root key, or a content key) calculated by the encryption and decryption arithmetic part 42 as described above is written to the key storing part 47. The key data read from the key storing part 47 is inputted to the key selecting part 48.

In addition, fixed value data Kf is inputted to the key selecting part 48. Under control of the command monitoring part 44, the key selecting part 48 selects either the hardware key Khd from the hardware key generating part 46, the process key, the root key, or the content key from the key storing part 47, or the fixed value data Kf. The key selecting part 48 inputs the selected key data Ksl to the encryption and decryption arithmetic part 42.

In the thus formed encryption and decryption processing unit 40, when input commands are inputted in a series of sequences, the encryption and decryption arithmetic part 42 sequentially calculates key data as follows.

Suppose that as shown in FIG. 2, the series of sequences is sequences 1, 2, 3, . . . , n−1, n, n+1, n+2, n+3, n+4, and n+5. To be exact, commands A1, A2, A3, . . . , An−1, An, B1, C1, C2, C3, and C4 are to be sequentially inputted in the sequences. Further, in each sequence, a CPU external to the encryption and decryption processing unit 40 inputs predetermined data as input data Din from a ROM external to the encryption and decryption processing unit 40.

In the first sequence 1, the command A1 is inputted. Thereby the key selecting part 48 selects the hardware key Khd as key data Ksl. The input side selecting part 41 selects input data Din at this time as input data Ein to the encryption and decryption arithmetic part 42. The encryption and decryption arithmetic part 42 calculates a process key K1 as output data Eout as a result of an operation. However, the process key K1 is not outputted to the outside of the encryption and decryption unit but is written to the key storing part 47.

In the next sequence 2, the command A2 is inputted. Thereby the key selecting part 48 selects as key data Ksl the process key K1 written to the key storing part 47 in the sequence 1. The input side selecting part 41 selects input data Din at this time as input data Ein to the encryption and decryption arithmetic part 42. The encryption and decryption arithmetic part 42 calculates a process key K2 as output data Eout as a result of an operation. The process key K2 is not outputted to the outside of the encryption and decryption unit but is written to the key storing part 47.

In the next sequence 3, the command A3 is inputted. Thereby the key selecting part 48 selects as key data Ksl the process key K2 written to the key storing part 47 in the sequence 2. The input side selecting part 41 selects input data Din at this time as input data Ein to the encryption and decryption arithmetic part 42. The encryption and decryption arithmetic part 42 calculates a process key K3 as output data Eout as a result of an operation. The process key K3 is not outputted to the outside of the encryption and decryption unit but is written to the key storing part 47.

Similarly, in the sequence n−1, the command An−1 is inputted. Thereby the key selecting part 48 selects as key data Ksl a process key Kn−2 written to the key storing part 47 in the immediately preceding sequence n−2. The input side selecting part 41 selects input data Din at this time as input data Ein to the encryption and decryption arithmetic part 42. The encryption and decryption arithmetic part 42 calculates a process key Kn−1 as output data Eout as a result of an operation. The process key Kn−1 is not outputted to the outside of the encryption and decryption unit but is written to the key storing part 47.

In the next sequence n, the command An is inputted. Thereby the key selecting part 48 selects as key data Ksl the process key Kn−1 written to the key storing part 47 in the immediately preceding sequence n−1. The input side selecting part 41 selects input data Din at this time as input data Ein to the encryption and decryption arithmetic part 42. The encryption and decryption arithmetic part 42 calculates a root key Krt, which is a process key in the nth stage, as output data Eout as a result of an operation. The root key Krt is not outputted to the outside of the encryption and decryption unit but is written to the key storing part 47.

In the next sequence n+1, the command B1 is inputted. Thereby the key selecting part 48 selects as key data Ksl the root key Krt written to the key storing part 47 in the immediately preceding sequence n. The input side selecting part 41 selects verifying data Drt, which is input data Din at this time, as input data Ein to the encryption and decryption arithmetic part 42. The encryption and decryption arithmetic part 42 provides data Edt of a content ("1") indicating that the root key Krt is obtained as output data Eout as a result of an operation.

However, this is limited to a case where the commands A1, . . . , and An are inputted in order until the sequence n. If a different command is inputted in the middle or if the order of the input commands is different, the root key Krt is not obtained in the sequence n, whereby the data Edt obtained as output data Eout in the sequence n+1 has a content ("0") indicating that the root key Krt is not obtained.

The command monitoring part 44 determines whether the command sequence so far has been correct by referring to the content of the data Edt. When the command sequence is not correct, the command monitoring part 44 performs processing against an illegal attack, which will be described later.

When the command sequence up to the sequence n+1 is correct, the command C1 is further inputted in the sequence n+2. Thereby the key selecting part 48 selects as key data Ksl the root key Krt written to the key storing part 47. The input side selecting part 41 selects input data Din at this time as input data Ein to the encryption and decryption arithmetic part 42. The encryption and decryption arithmetic part 42 obtains data after an operation as output data Eout. The same is performed in the next sequence n+3 and the further sequence n+4. The data after these operations is neither outputted to the outside of the encryption and decryption unit nor written to the key storing part 47.

In the next sequence n+5, the command C4 is inputted. Thereby the key selecting part 48 selects as key data Ksl the root key Krt written to the key storing part 47. The input side selecting part 41 selects input data Din at this time as input data Ein to the encryption and decryption arithmetic part 42. The encryption and decryption arithmetic part 42 calculates a content key Kct as output data Eout as a result of an operation. The content key Kct is not outputted to the outside of the encryption and decryption unit but is written to the key storing part 47.

After carrying out the sequence n+5, it is possible to decrypt encrypted data or encrypt plaintext data with the content key Kct stored in the key storing part 47.

In this case, a command for specifying a decryption or encryption mode is inputted as an input command. The key selecting part 48 selects as key data Ksl the content key Kct read from the key storing part 47. The input side selecting part 41 selects encrypted data or plaintext data, which is input data Din at this time, as input data Ein to the encryption and decryption arithmetic part 42. The encryption and decryption arithmetic part 42 decrypts or encrypts the data. The output side selecting part 43 outputs the decrypted or encrypted data as output data Dout to the outside of the encryption and decryption unit by the data output means 63.

On the other hand, when as an example of an illegal attack, the proper command C1 is inputted in the sequence n+2 as shown as an attack 1 but the command C3 is inputted in the next sequence n+3 as shown as an attack 2, the command monitoring part 44 determines that an illegal attack is made and performs processing against the illegal attack.

Specifically, as initialization processing in this case, the key selecting part 48 selects the fixed value data Kf as key data Ksl. The input side selecting part 41 selects the fixed value data Df as input data Ein to the encryption and decryption arithmetic part 42. The encryption and decryption arithmetic part 42 calculates certain data as output data Eout. The output side selecting part 43 outputs the data to the outside through the data output means 63.

FIG. 3 shows an example of a data receiving system. The data receiving system in this example receives data encoded and encrypted with a secret key by ripping from a recording medium 1, downloading from a distribution system 2 using the Internet, or the like by a terminal 10 such as a PC or the like.

The received data is transmitted from the terminal 10 to a recording and reproducing apparatus 20 connected to a USB (Universal Serial Bus) terminal of the terminal 10.

The recording and reproducing apparatus 20 records the data on a recording medium 5 and reproduces the data from the recording medium 5. The recording and reproducing apparatus 20 is provided with an encrypting and decrypting device 30.

The encrypting and decrypting device 30 includes the foregoing encryption and decryption processing unit 40 shown in FIG. 1 and a CPU 31. A bus 32 of the encrypting and decrypting device 30 is connected with a ROM 33 in which programs for command transmission and reception, encryption and decryption processing and the like to be performed by the CPU 31, necessary fixed data, and the like are written, a RAM 34 functioning as a work area for the CPU 31 and the like, a USB interface 36 for exchanging commands with the terminal 10 and capturing data from the terminal 10, an interface 37 for outputting data to a DSP (Digital Signal Processor) 26 in a main body section of the recording and reproducing apparatus, and an interface 39 for exchanging commands with a CPU 21 in the main body section of the recording and reproducing apparatus.

The encrypting and decrypting device 30 is formed as a one-chip LSI (Large-Scale Integrated circuit).

In the main body section of the recording and reproducing apparatus, a bus 22 of the CPU 21 is connected with a ROM 23 in which programs to be executed by the CPU 21, necessary fixed data, and the like are written, a RAM 24 functioning as a work area for the CPU 21, and the above-mentioned DSP 26. The DSP 26 is connected with a recording and reproducing processing unit 27 and an output processing unit 28.

In the encrypting and decrypting device 30, data read from the ROM 33 is inputted as the input data Din in each of the sequences as described above to the encryption and decryption processing unit 40.

The data, which is captured from the terminal 10 via the USB interface 36 and is encoded and encrypted with a secret key, is decrypted with a content key Kct as described above by the encryption and decryption processing unit 40. The encoded data as decrypted plaintext data is sent to the DSP 26 via the interface 37 by the data output means 63 shown in FIG. 1. After being processed by the DSP 26, the data is recorded on the recording medium 5 by the recording and reproducing processing unit 27. Alternatively, the data is converted into an analog signal by the output processing unit 28 and the analog signal is outputted to an output terminal 29.

When an illegal attack is made at the terminal 10, the processing against the illegal attack as described above is performed at the encrypting and decrypting device 30, whereby the recording of the data onto the recording medium 5 and the output of the signal to the output terminal 29 are prevented.

While FIG. 3 shows an example of a recording and reproducing apparatus, the present invention is applicable to a data receiving apparatus without a recording and reproducing function.

As described above, according to the present invention, it is possible to realize an arithmetic unit and an arithmetic method that ensure security of data as a result of arithmetic processing.

The invention claimed is:

1. An arithmetic unit comprising:
   a data input interface configured to input data to be subjected to arithmetic processing for at least one of encryption, decryption, or key generation;

a command input interface configured to input a command for specifying processing on said data;

an arithmetic processor configured to subject the data inputted by said data input interface to arithmetic processing;

a data output interface configured to output the data processed by the arithmetic processor;

an output selector configured to select data to be outputted from the data output interface; and a controller configured to control said output selector such that only data allowed to be outputted is outputted from said data output interface on the basis of the command inputted by said command input interface.

2. The arithmetic unit as claimed in claim 1, wherein said controller includes a determining part configured to determine an input order of commands inputted by said command input interface, and controls said output selector on the basis of a result of the determination.

3. The arithmetic unit as claimed in claim 2, further comprising;

an input data selector configured to select the data inputted by said data input interface and second fixed value data and outputting the selected data, wherein when said controller determines that commands are inputted in a different order from a predetermined order, said controller controls said input data selector such that said input data selector selects said second fixed value data and inputs said second fixed value data to said arithmetic processor.

4. The arithmetic unit as claimed in claim 2, further comprising command storage configured to store a command inputted by said command interface, wherein said controller is configured to determine a command input order on the basis of the command stored in said command storage and an input command.

5. The arithmetic unit as claimed in claim 1, further comprising a storage configured to store at least one piece of data processed by said arithmetic processor.

6. The arithmetic unit as claimed in claim 5, wherein said arithmetic processor uses the data stored in said storage and the data inputted by said data input interface for an operation.

7. The arithmetic unit as claimed in claim 1, further comprising a data generator configured to generate initial value data, wherein said arithmetic processor is configured to use the initial value data generated by the data generator and the data inputted by said data input interface for an operation.

8. The arithmetic unit as claimed in claim 7, further comprising a storage configured to store at least one piece of data processed by said arithmetic processor.

9. The arithmetic unit as claimed in claim 8, further comprising a data selector configured to select the data stored in said storage and the initial value data generated by said data generator and inputting the selected data to said arithmetic processor, wherein said controller is configured to control said data selector to selectively input the data stored in said storage and the initial value data generated by said data generator into said arithmetic processor on the basis of the command inputted by said command input interface; and said arithmetic processor is configured to subject the data selected by said data selector and the data inputted by said data input interface to an operation.

10. The arithmetic unit as claimed in claim 9, wherein first fixed value data is further inputted to said data selector; and when said controller determines that commands are inputted in a different order from a predetermined order, said controls said data selector such that said data selector selects said first fixed value data and inputs said first fixed value data to said arithmetic processor.

11. The arithmetic unit as claimed in claim 1, wherein the controller is further configured to control said output selector such that encryption or description data that is encrypted or decrypted by the arithmetic processor is output by the output interface, and key data processed by the arithmetic processor is not output by the output interface.

12. An arithmetic method comprising the steps of:

performing arithmetic processing on input data on the basis of an input command to generate at least one of encrypted data, decrypted data, or an key;

determining whether the input command specifies output of an encryption or decryption result of the arithmetic processing; and outputting the result of the arithmetic processing on said input data when the input command specifies the output of the result of the arithmetic processing.

13. The arithmetic method as claimed in claim 12, further comprising the steps of:

storing the input command; and determining that said result of the arithmetic processing is to be outputted on the basis of the stored command and a newly input command when input order of the commands is predetermined order.

14. The arithmetic method as claimed in claim 12, wherein the outputting outputs encryption or description data that is encrypted or decrypted by said step of arithmetic processing, and does not output key data processed by said step of arithmetic processing.

* * * * *